United States Patent
Nishiguchi

(10) Patent No.: US 9,467,549 B2
(45) Date of Patent: Oct. 11, 2016

(54) EXTERNAL APPARATUS, COMMUNICATION APPARATUS, AND CONTROL METHOD THEREFOR

(71) Applicant: CANON KABUSHIKI KAISHA, Tokyo (JP)

(72) Inventor: Tatsuya Nishiguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/794,288

(22) Filed: Jul. 8, 2015

(65) Prior Publication Data

US 2016/0014248 A1    Jan. 14, 2016

(30) Foreign Application Priority Data

Jul. 10, 2014   (JP) .................................. 2014-142640

(51) Int. Cl.

| H04M 1/21 | (2006.01) |
|---|---|
| H04M 1/725 | (2006.01) |
| H04W 12/04 | (2009.01) |
| H04N 5/225 | (2006.01) |

(52) U.S. Cl.
CPC ......... *H04M 1/72533* (2013.01); *H04N 5/225* (2013.01); *H04W 12/04* (2013.01)

(58) Field of Classification Search
CPC .............. F25D 29/00; H04N 1/00007; H04L 63/0876; H04L 63/0457; H04L 63/0434; H04L 9/3297; G06F 21/35; G07C 9/00309
USPC ............ 455/411; 236/94; 62/246; 340/10.42, 340/539.12; 600/549
See application file for complete search history.

(56) References Cited

U.S. PATENT DOCUMENTS

| 2007/0152076 A1* | 7/2007 | Chiang ................... F25D 29/00 236/94 |
|---|---|---|
| 2010/0283586 A1* | 11/2010 | Ikeda ................. H04N 1/00007 340/10.42 |
| 2012/0264504 A1 | 10/2012 | Gagner et al. |

FOREIGN PATENT DOCUMENTS

| JP | 2007-013880 A | 1/2007 |
|---|---|---|
| JP | 2008-167269 A | 7/2008 |
| JP | 2011-221995 A | 11/2011 |

OTHER PUBLICATIONS

The above references were cited in related U.S. Appl. No. 14/794,498, filed Jul. 8, 2015 "Communication Apparatus, External Apparatus, and Control Method Therefor".
The above patent document was cited in a Mar. 30, 2016 Office Action, that issued in related U.S. Appl. No. 14/794,498.

* cited by examiner

*Primary Examiner* — Phuoc H Doan
(74) *Attorney, Agent, or Firm* — Cowan, Liebowitz & Latman, P.C.

(57) ABSTRACT

An external apparatus which is controlled by a communication apparatus, comprises a control unit configured to execute functions corresponding to operation information received from the communication apparatus, a changing unit configured to change the operation information that are assigned in every function, wherein the operation information is changed by the changing unit each time connection to the communication apparatus is established, and a transmission unit configured to transmit the changed operation information that are assigned in every function to the communication apparatus together with decryption information for the changed operation information that is encrypted.

20 Claims, 11 Drawing Sheets

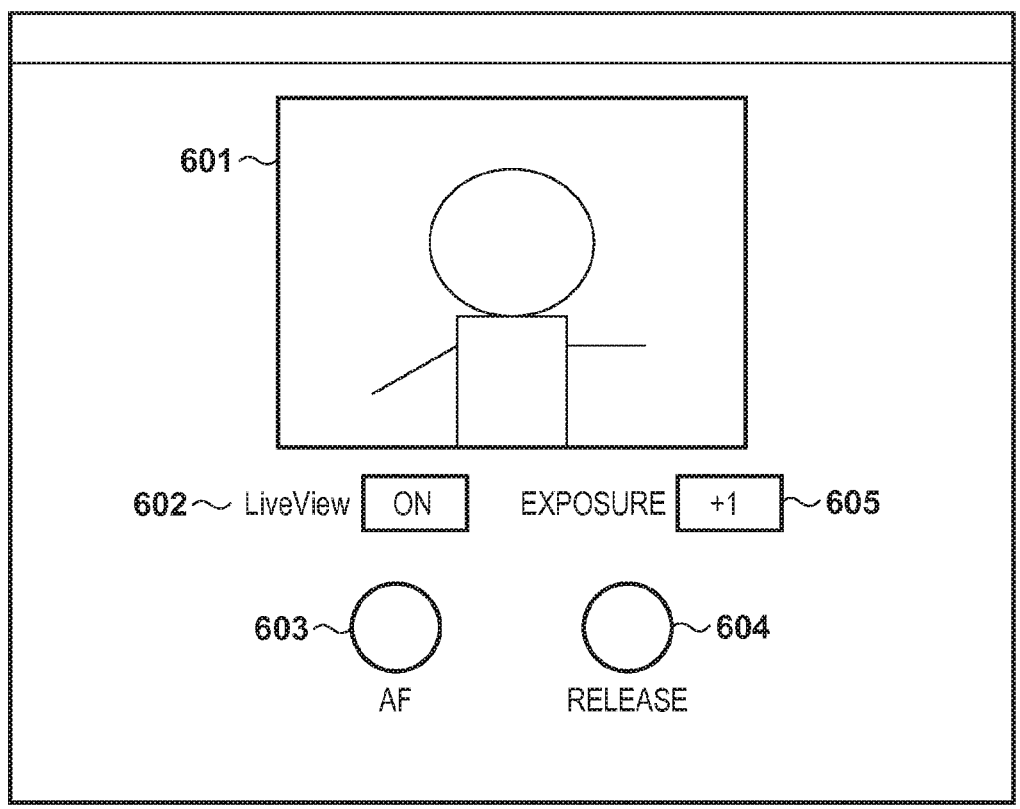

F I G. 8A

| CONTROL FUNCTION | OPERATION NUMBER |
|---|---|
| AF START | 3 |
| RELEASE | 1 |
| CHANGE IN PARAMETER | 6 |
| LV START | 4 |
| ACQUISITION OF LV IMAGE | 2 |
| ACQUISITION OF IMAGE FILE | 7 |

F I G. 8B

| CONTROL FUNCTION | OPERATION NUMBER |
|---|---|
| AF START | 5 |
| RELEASE | 3 |
| CHANGE IN PARAMETER | 1 |
| LV START | 6 |
| ACQUISITION OF LV IMAGE | 4 |
| ACQUISITION OF IMAGE FILE | 2 |
| SUCCESSFUL DECRYPTION | 7 |

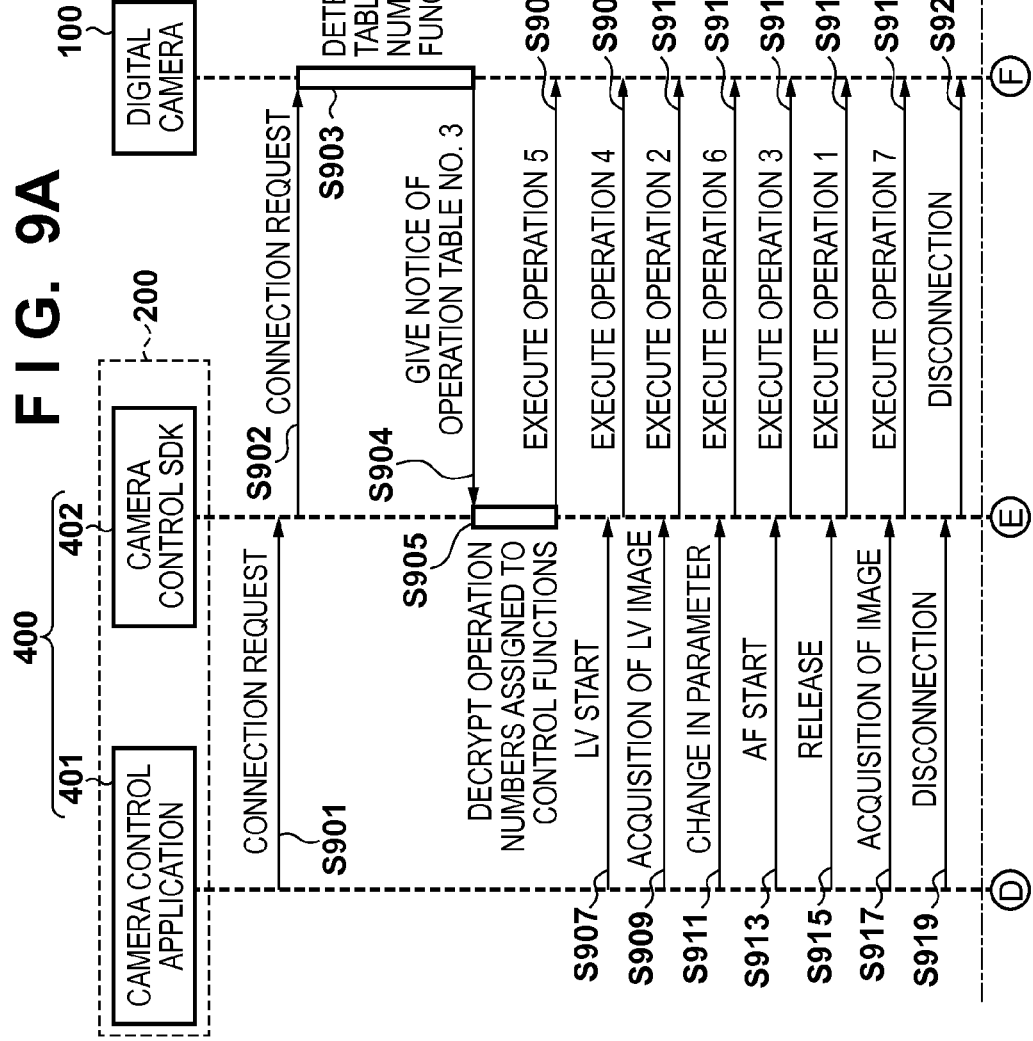

FIG. 10

|  | OPERATION TABLE NUMBER | | | | |
| --- | --- | --- | --- | --- | --- |
|  | 1 | 2 | 3 | 4 | 5 |
| AF START | 1 | 2 | 3 | 4 | 5 |
| RELEASE | 6 | 7 | 1 | 2 | 3 |
| CHANGE IN PARAMETER | 4 | 5 | 6 | 7 | 1 |
| LV START | 2 | 3 | 4 | 5 | 6 |
| ACQUISITION OF LV IMAGE | 7 | 1 | 2 | 3 | 4 |
| ACQUISITION OF IMAGE FILE | 5 | 6 | 7 | 1 | 2 |
| SUCCESSFUL DECRYPTION | 3 | 4 | 5 | 6 | 7 |

EXTERNAL APPARATUS, COMMUNICATION APPARATUS, AND CONTROL METHOD THEREFOR

BACKGROUND OF THE INVENTION

1. Field of the Invention

The present invention relates to a technique to remotely control an external apparatus using a communication apparatus.

2. Description of the Related Art

In recent years, there is an increasing demand to remotely control an external apparatus, such as a digital camera, from a communication apparatus, such as a smartphone. As application software (hereinafter, application) for controlling digital cameras from smartphones and the like, there are applications provided by camera manufacturers for their digital cameras; however, there is a demand by a third party other than these camera manufacturers to develop camera applications different from the provided applications.

To meet this demand, in some cases, camera manufacturers provide software development kits (hereinafter, SDKs) that enable camera control. With the use of software like SDKs, software developers can develop camera applications more easily (Japanese Patent Laid-Open No. 2011-221995, Japanese Patent Laid-Open No. 2007-013880).

By taking advantage of applications that use SDKs, external apparatuses, such as cameras, communicate with SDK interfaces.

However, if communication between SDKs and external apparatuses is analyzed, applications that directly control cameras without using SDKs can be undesirably generated. In this case, there is a possibility that cameras are subjected to unexpected control.

SUMMARY OF THE INVENTION

The present invention has been made in consideration of the aforementioned problems, and realizes a technique to improve security at the time of communication between an external apparatus and a communication apparatus.

In order to solve the aforementioned problems, the present invention provides an external apparatus which is controlled by a communication apparatus, comprising: a control unit configured to execute functions corresponding to operation information received from the communication apparatus; a changing unit configured to change the operation information that are assigned in every function, wherein the operation information is changed by the changing unit each time connection to the communication apparatus is established; and a transmission unit configured to transmit the changed operation information that are assigned in every function to the communication apparatus together with decryption information for the changed operation information that is encrypted.

In order to solve the aforementioned problems, the present invention provides a communication apparatus which controls an external apparatus, comprising: a communication unit configured to control communication with the external apparatus; a control unit configured to control the external apparatus by causing the communication unit to transmit, to the external apparatus, operation information for causing the external apparatus to execute a predetermined function; and an acquisition unit configured to receive decryption information together with the operation information transmitted from the external apparatus, wherein the operation information is changed and encrypted by the external apparatus each time connection to the external apparatus is established, and to acquire the changed operation information through decryption using the decryption information.

In order to solve the aforementioned problems, the present invention provides a control method of an external apparatus which is communicated with and controlled by a communication apparatus, the method comprising: a step of executing functions corresponding to operation information received from the communication apparatus; and a step of changing the operation information that are assigned in every function, wherein the operation information is changed each time connection to the communication apparatus is established; and a step of transmitting the changed operation information that are assigned in every function to the communication apparatus together with decryption information for the changed operation information that is encrypted.

In order to solve the aforementioned problems, the present invention provides a control method of a communication apparatus which controls an external apparatus, the method comprising: a step of controlling communication with the external apparatus; a step of controlling the external apparatus by transmitting operation information for causing the external apparatus to execute a predetermined function to the external apparatus; a step of receiving decryption information together with the operation information transmitted from the external apparatus, wherein the operation information is changed and encrypted by the external apparatus each time connection to the external apparatus is established; and a step of acquiring the changed operation information through decryption using the decryption information.

In order to solve the aforementioned problems, the present invention provides a system in which a communication apparatus and an external apparatus are connected, wherein the external apparatus comprises: a control unit configured to execute functions corresponding to operation information received from the communication apparatus; a changing unit configured to change the operation information that are assigned in every function, wherein the operation information is changed by the changing unit each time connection to the communication apparatus is established; and a transmission unit configured to transmit the changed operation information that are assigned in every function to the communication apparatus together with decryption information for the changed operation information that is encrypted, and wherein the communication apparatus comprises: a communication unit configured to control communication with the external apparatus; a control unit configured to control the external apparatus by causing the communication unit to transmit the operation information to the external apparatus, each piece of operation information causing the external apparatus to execute a corresponding one of the predetermined functions; and an acquisition unit configured to receive the decryption information together with the operation information transmitted from the external apparatus, wherein the operation information are changed and encrypted by the external apparatus each time connection to the external apparatus is established, and to acquire the changed operation information through decryption using the decryption information.

According to the present invention, it is possible to improve security at the time of communication between an external apparatus and a communication apparatus.

Further features of the present invention will become apparent from the following description of exemplary embodiments (with reference to the attached drawings).

BRIEF DESCRIPTION OF THE DRAWINGS

FIG. 6 shows an example of an application screen.

FIGS. 8A and 8B show examples of control functions and operation numbers according to the first embodiment.

FIGS. 9A and 9B show processing sequences of the camera application and the digital camera according to a second embodiment.

FIG. 10 shows an example of control functions, operation numbers, and operation table numbers according to the second embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

The following describes a system in which a smartphone, which is one type of a mobile telephone, and a digital single-lens reflex camera (hereinafter, digital camera) are used as a communication apparatus and an external apparatus of the present invention, and the smartphone and the digital camera are connected via a network. Although the external apparatus is assumed to be a digital single-lens reflex camera in the present embodiment, the present invention is not limited in this way, and the external apparatus may be a compact digital camera, a mobile electronic apparatus such as a tablet, a personal computer equipped with a web camera, etc. Furthermore, although the communication apparatus is assumed to be a smartphone in the present embodiment, the present invention is not limited in this way, and the communication apparatus may be a tablet, a personal computer, a personal digital assistant (PDA), a mobile AV player, a game console, an electronic book, etc.

<Configuration of Digital Camera 100>

An overview of a configuration and functions of a digital camera 100 of the embodiments according to the present invention will now be described with reference to FIG. 1.

Figure 1:
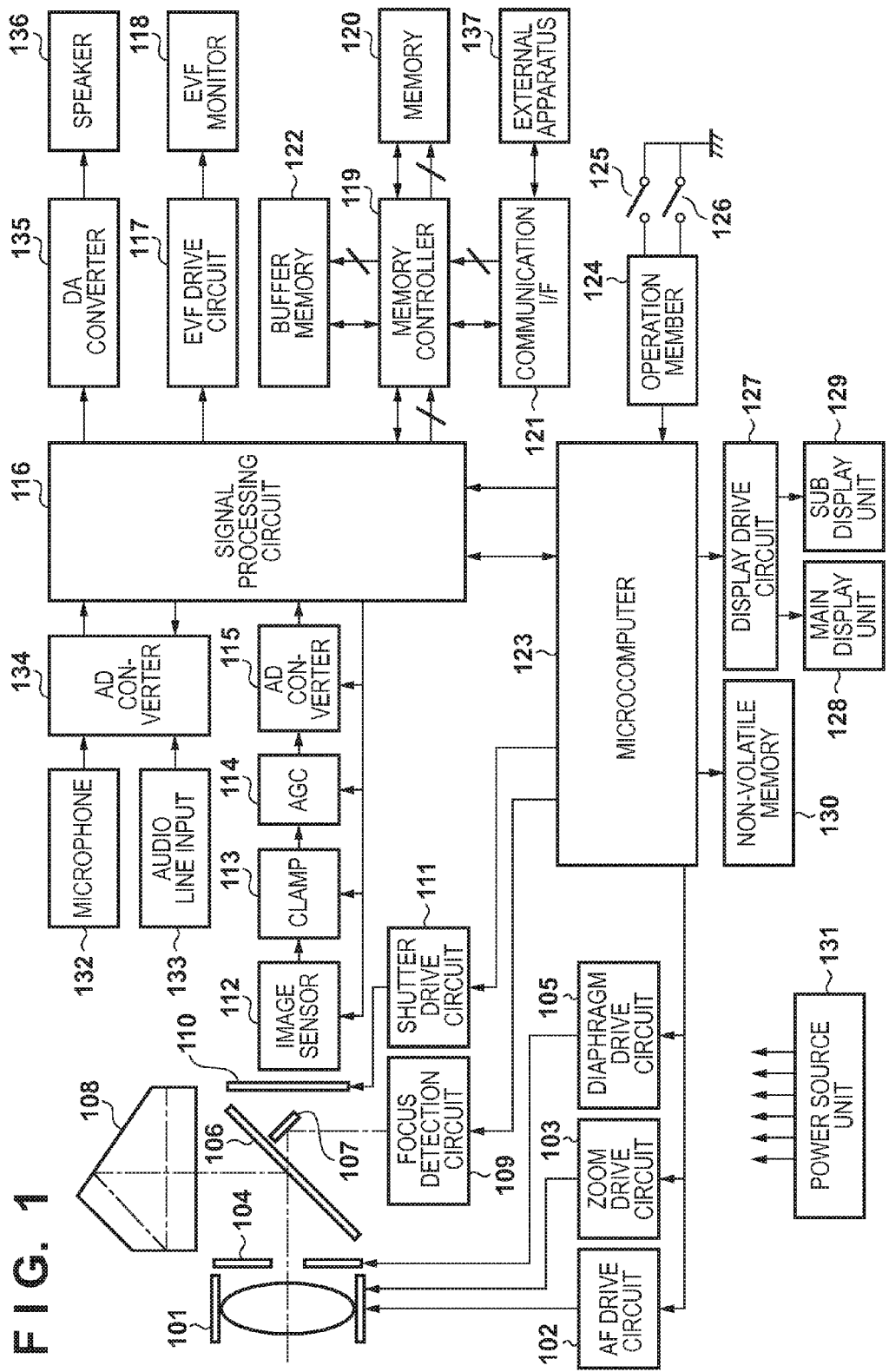
FIG. 1 is a block diagram showing a configuration of a digital camera according to present embodiments.

In FIG. 1, a shooting lens 101 includes a zoom lens and a focus lens, and can be built in a camera body, or is attachable to and detachable from the camera body, as a lens unit. An autofocus (AF) drive circuit 102 includes, for example, a DC motor and an ultrasonic motor, and achieves focus by changing a focus lens position in accordance with a control instruction from a microcomputer 123.

A zoom drive circuit 103 includes, for example, a DC motor and an ultrasonic motor, and changes a focal length by changing a zoom lens position in accordance with a control instruction from the microcomputer 123.

A diaphragm drive circuit 105 drives a diaphragm 104 in accordance with a control instruction from the microcomputer 123 so as to change an optical f-number of the diaphragm 104. The optical f-number of the diaphragm 104 is calculated by the microcomputer 123.

A main mirror 106 switches between an optical path for directing a light beam incident from the shooting lens 101 toward a viewfinder and an optical path for directing the light beam toward an image sensor. A force is always applied so as to place the main mirror 106 in a mirror down position for directing the light beam toward the viewfinder; however, at the time of shooting and live view, a non-illustrated mirror drive circuit flips up the mirror, that is to say, places the mirror in a mirror up position by retracting the mirror from an optical axis, so as to direct the light beam toward the image sensor. The main mirror 106 is a half mirror that can transmit a part of the light beam at its central portion, and makes the part of the light beam incident on AF sensors for performing focus detection. It should be noted that the AF sensors are disposed inside a focus detection circuit 109. A sub mirror 107 reflects the light beam transmitted through the main mirror 106 toward the AF sensors.

A pentaprism 108 composes the viewfinder. The viewfinder is comprised of a non-illustrated focusing screen, eyepiece lens, and the like in addition to the pentaprism 108, and the light beam reflected by the main mirror 106 is incident on these components and directed to the viewfinder.

The focus detection circuit 109 performs focus detection using, for example, a phase difference between two images formed via the lenses, and includes a pair of AF sensors in the present example. The light beam that has been transmitted through the central portion of the main mirror 106 and reflected by the sub mirror 107 arrives at the pair of AF sensors that is disposed inside the focus detection circuit 109 for performing photoelectric conversion. A defocus amount indicating the state of focus adjustment of the shooting lens 101 with respect to a subject is obtained by calculating the output from the pair of AF sensors. The microcomputer 123 evaluates the calculation result and issues a control instruction to the AF drive circuit 102 so as to drive the focus lens.

A reference numeral 110 denotes a focal-plane shutter. A shutter drive circuit 111 drives the focal-plane shutter 110 at a shutter speed corresponding to a control instruction from the microcomputer 123.

An image sensor 112 is an image sensor using photoelectric conversion elements, such as a CCD and a CMOS, and generates an analog image signal by applying photoelectric conversion to a subject image formed by the shooting lens 101.

A clamp circuit 113 and an AGC circuit 114 apply basic analog signal processing to the analog image signal obtained from the image sensor 112, and their clamp level and AGC reference level are changed by the microcomputer 123.

An AD converter 115 converts the analog image signal which has been obtained from the image sensor 112 and to which the analog signal processing has been applied into a digital signal, and outputs the digital signal to a signal processing circuit 116.

The signal processing circuit 116 is realized by a logic device, such as a gate array. The signal processing circuit 116 applies filter processing, color conversion processing, gamma processing, and compression processing according to JPEG and the like to a digital image signal from the AD converter 115 or to image data read from a memory 120, and outputs the resultant image signal or image data to a memory controller 119. The memory controller 119 performs writing and reading of image data between the memory 120 or a buffer memory 122 and the signal processing circuit 116. The signal processing circuit 116 also calculates information of exposure (AE), white balance (WB), and the like as necessary using the image signal obtained from the image sensor 112, and outputs the calculation result to the microcomputer 123. The microcomputer 123 adjusts white balance and gain based on the calculation result.

In continuous shooting, image signals are first stored into the buffer memory 122 without being processed; then, the unprocessed image signals are read via the memory controller 119, and the signal processing circuit 116 applies image processing and compression processing thereto. The number of images obtained through continuous shooting depends on the capacity of the buffer memory 122.

The signal processing circuit 116 also applies compression processing to a digital audio signal input from a microphone 132 and audio line input 133 via an AD converter 134, and outputs the resultant digital audio signal to the memory controller 119. The signal processing circuit 116 can also output, to a speaker 136 via a DA converter 135, digital audio data that is input from the microphone 132 and audio line input 133. The DA converter 135 converts a digital signal into an analog signal.

An electronic viewfinder (EVF) drive circuit 117 displays image data output from the signal processing circuit 116 on an EVF monitor 118 in accordance with a control signal from the microcomputer 123.

The memory controller 119 stores an unprocessed digital image signal and audio signal input from the signal processing circuit 116 into the buffer memory 122, and stores a processed digital image signal and audio signal into the memory 120. The memory controller 119 also outputs image data and audio data read from the buffer memory 122 and the memory 120 to the signal processing circuit 116. In some cases, the memory 120 is detachable from an apparatus body. The memory controller 119 can output image data and audio data stored in the memory 120 to an external apparatus 137 via a communication interface (I/F) 121.

The communication I/F 121 has a function of transmitting and receiving a control signal, an image signal, an audio signal, and the like to and from the external apparatus 137, and no particular limitation is intended regarding a communication method, that is to say, communication may be performed using a wireless LAN, a wired LAN, USB, Bluetooth (registered trademark), etc. Here, the external apparatus 137 may be any apparatus, e.g., a personal computer, a camera, a mobile telephone, a smartphone, a hard disk recorder, a game console, and a remote control, as long as it can communicate with the digital camera 100. In a case where the communication I/F 121 performs communication using a wireless LAN, elements such as an antenna, an RF unit, and a baseband unit are provided, and packets compliant with the supported wireless LAN standards can be transmitted and received.

The microcomputer 123 is a calculation processing apparatus that integrally controls the entirety of the apparatus, and executes processing sequences described later by executing programs stored in a non-volatile memory 130.

An operation member 124 includes buttons, a dial, a touch panel (touchscreen), and the like for receiving a user operation. The microcomputer 123 controls various elements in accordance with a change in the state of the operation member 124. The operation member 124 also includes a first switch 125 and a second switch 126 that are turned on and off by an operation on a release button.

The first switch 125 is turned on and generates a first switch signal SW1 in the middle of an operation on the release button provided to the camera, that is to say, when the release button is pressed halfway down (issuance of a shooting preparation instruction). The microcomputer 123 starts operations for AF processing, AE processing, WB processing, and the like in response to the first switch signal SW1.

The second switch 126 is turned on and generates a second switch signal SW2 when an operation on a shutter button has been completed, that is to say, when the shutter button is pressed all the way down (issuance of a shooting instruction). In response to the second switch signal SW2, the microcomputer 123 starts an operation for a series of shooting processes, from reading of a signal from the image sensor 112 to writing of image data to the memory 120.

Furthermore, while the first switch signal SW1 and the second switch signal SW2 are both in an on state, a continuous shooting operation is performed.

The operation member 124 also includes a main switch, a shooting mode dial, an ISO setting button, a menu button, a set button, a flash setting button, a button for switching among single shooting, continuous shooting, and a self-timer, a switch + (plus) button and a switch − (minus) button for switching to a menu and switching among reproduced images, an exposure correction button, a button for enlarging a displayed image, a button for reducing a displayed image, a reproduction switch, a diaphragm button, an erase button, a button for displaying information related to shooting and reproduction, etc.

A display drive circuit 127 drives a main display unit 128 on the back surface of the camera body and a sub display unit 129 inside the viewfinder in accordance with a control instruction from the microcomputer 123. A backlight (not illustrated) comprised of, for example, LEDs driven by the display drive circuit 127 is provided in the sub display unit 129. The microcomputer 123 checks the capacity of the memory 120 via the memory controller 119 based on a predicted value of image data corresponding to the ISO speed, image size, and image quality that have been set in advance. Based on the capacity of the memory 120, the microcomputer 123 calculates the remaining number of images that can be shot, and performs control to display the calculated number on the main display unit 128 and the sub display unit 129 as necessary.

The non-volatile memory 130 is an electrically erasable and recordable memory, such as an EEPROM. The non-volatile memory 130 stores constants, programs, and the like for the operations of the microcomputer 123. The programs mentioned here denote programs for executing processing sequences described later.

A power source unit 131 is constituted, for example, by a primary battery such as an alkaline battery and a lithium battery, by a secondary battery such as a NiCd battery, a NiMH battery, and a lithium-ion battery, or by an AC adaptor, and supplies necessary power to various elements.

<Configuration of Smartphone 200>

An overview of a configuration and functions of a smartphone 200 of the embodiments according to the present invention will now be described with reference to FIG. 2.

Figure 2:
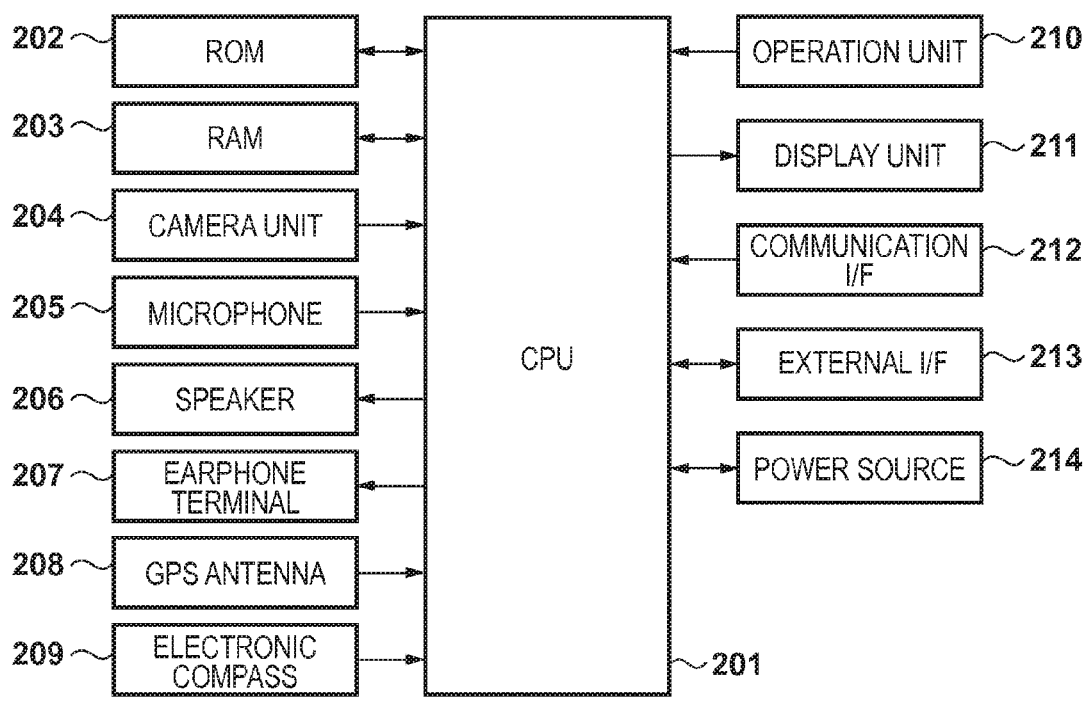
FIG. 2 is a block diagram showing a configuration of a smartphone according to the present embodiments.

In FIG. 2, a CPU 201 controls various elements of the smartphone 200. A RAM 203 is a main memory for storing data.

A ROM 202 is an electrically erasable and recordable flash memory, and is used to store data and various types of programs, such as application software and an OS executed by the CPU 201. The ROM 202 also stores various types of contents, such as moving images and still images captured by a camera unit 204.

The RAM 203 is mainly used as a storage area for various types of data, e.g., an area into which a program executed by the CPU 201 is stored or deployed, and a working area during program execution.

The camera unit 204 includes an image sensor constituted by, for example, a CMOS for converting a subject image into an electrical signal, a lens for forming the subject image onto the image sensor, a diaphragm, a shutter, etc. The camera unit 204 also includes an A/D converter for converting an analog image signal output from the image sensor into a digital signal.

A microphone 205 and a speaker 206 are used in a call to/from a user of another communication apparatus. The speaker 206 and an earphone terminal 207 output an audio signal stored in the ROM 202, and an audio signal input from, for example, a telephone line via a communication I/F 212, an external I/F 213, and the like.

A global positioning system (GPS) unit 208 has a GPS antenna for acquiring information of the current position of the smartphone 200 by receiving radio waves from a GPS satellite.

An electronic compass 209 acquires information of the direction in which the smartphone 200 is facing by detecting the geomagnetic orientation.

An operation unit 210 is comprised of a physical switch, button, and the like, receives a user operation, and transmits a control signal to the CPU 201. The CPU 201 receives a control signal input from the operation unit 210, and controls various elements of the smartphone 200. The operation unit 210 also includes a touch panel that can detect contact with a display unit 211, and constitutes a GUI that enables the user to feel as if he/she can directly operate a screen displayed on the display unit 211. The CPU 201 detects the user's contact with the touch panel and executes processing corresponding to the position of contact. The type of the touch panel may be selected from among various types including a resistive type, a capacitive type, a surface acoustic wave type, an infrared type, an electromagnetic induction type, an image recognition type, and an optical sensor type.

The display unit 211 is, for example, a liquid crystal panel or an organic EL panel, and displays images, a GUI, and the like.

The touch panel is integrally constructed with the display unit 211, and the capable of detecting a touch operation on the display unit 211. Input coordinates on the touch panel and display coordinates on the display unit 211 are correlated. As a result, a GUI can be constructed that makes it possible for the user to directly manipulate the screen displayed on the display unit 211. The CPU 201 is capable of detecting the following operations performed by contacting the touch panel: touching of the panel using a finger or pen (referred to as "touch-down" below); a state in which the touch panel is in contact with a finger or pen (referred to as "touch-on" below); movement of a finger or pen while in contact with the touch panel (referred to as "move" below); lifting of a finger or pen that has been in contact with the touch panel (referred to as "touch-up" below); and a state in which the touch panel is not being touched at all (referred to as "touch-off" below). These operations and position coordinates at which the touch panel is being touched by the finger or pen are communicated to the CPU 201 and, based upon the information thus communicated, the CPU 201 determines what kind of operation was performed on the touch panel. As for "move", the determination can be made also for every vertical component and horizontal component with regard to the direction of movement of the finger or pen, which is moved on the touch panel, based upon a change in the coordinate position. Further, it is assumed that a stroke has been made when "touch-up" is performed following a regular "move" after a "touch-down" on the touch panel. A very quick stroke action is referred to as a "flick". A "flick" is an operation in which, with fingers in contact with the touch panel, the fingers are moved rapidly over a certain distance and then lifted. In other words, this is a rapid tracing operation in which the fingers are flicked across the surface of the touch panel. The CPU 201 can determine that a "flick" has been performed when it detects such movement over a predetermined distance or greater and at a predetermined speed or greater and then detects "touch-up". Further, the CPU 201 can determine that "drag" has been performed if it detects movement over a predetermined distance or greater at a speed less than a predetermined speed.

The communication I/F 212 has a function of transmitting and receiving a control signal, an image signal, an audio signal, and the like to and from an external apparatus, such as a digital camera, a printer, and another communication apparatus. For example, a picture transfer protocol (PTP) or a media transfer protocol (MTP) is used as a protocol for establishing connection to and performing data communication with a digital camera. It should be noted that no particular limitation is intended regarding a communication method, and communication is performed using a wireless LAN, a wireless wide area network (WWAN), a wired LAN, Bluetooth (registered trademark), etc. Here, the external apparatus may be any apparatus, e.g., a personal computer, a camera, a mobile telephone, a smartphone, a hard disk recorder, a game console, and a remote control, as long as it can communicate with the smartphone 200. In a case where the communication I/F 212 performs communication using a wireless LAN, elements such as an antenna, an RF unit, and a baseband unit are provided, and packets compliant with the supported wireless LAN standards can be transmitted and received.

The external I/F 213 is in conformity with various types of standards, such as USB and HDMI (registered trademark), and exchanges video data and audio data with the external apparatus. The external I/F 213 also exchanges data with a recording medium, such as a memory card and a hard disk.

A power source unit 214 is constituted by a secondary battery such as a lithium-ion battery or by an AC adaptor, and supplies necessary power to various elements.

<System Configuration>

A system configuration of the present embodiment will now be described with reference to FIG. 3.

In the system according to the present embodiment, the digital camera 100 and the smartphone 200 are connected via the communication I/Fs 121, 212, and the smartphone 200 can remotely control the digital camera 100.

Figure 3:
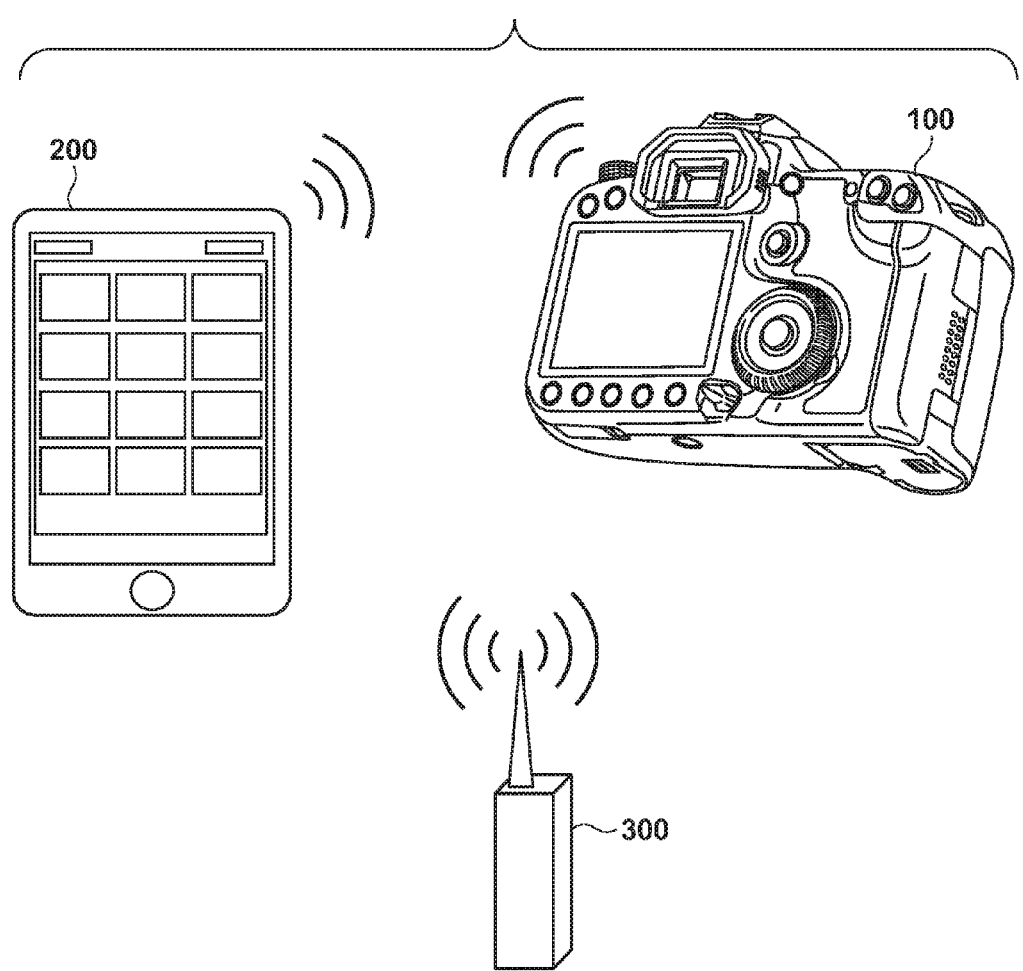
FIG. 3 shows a system configuration according to the present embodiments.

As shown in FIG. 3, the digital camera 100 and the smartphone 200 are connected via an access point (hereinafter, AP) 300 compliant with the wireless LAN standards of IEEE 802.11. It should be noted that communication between the digital camera 100 and the smartphone 200 may be performed through direct connection using an ad hoc network and the like, or through infrastructure connection via the AP 300 and the like. Furthermore, the digital camera 100 may serve as a simple access point so as to establish communication directly with the smartphone 200 through infrastructure connection.

<Description of Application>

Figure 4:
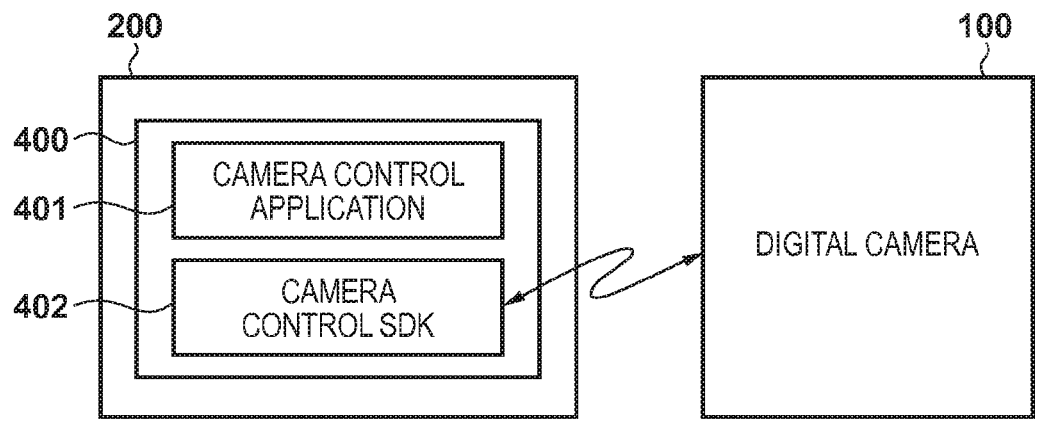
FIG. 4 shows a software configuration of a camera application according to the present embodiments.

A description is now given of a software configuration of a camera application according to the present embodiment with reference to FIG. 4.

In order to realize the system according to the present embodiment, it is necessary to install, in the smartphone 200, communication control application software (hereinafter, camera application) 400 for remotely controlling the digital camera 100. It should be noted that the camera application 400 may be preinstalled at the time of shipment of the smartphone 200, or may be installed by a user operation after the purchase of the smartphone 200.

The camera application 400 is application software that is mainly used to remotely control the digital camera 100. The user can download the camera application 400 from a predetermined server via, for example, the Internet, and install the same in the smartphone 200.

The camera application 400 includes a camera control software development kit (SDK) 402, which is a software program playing a role in communication with the digital camera 100, as a library. Direct communication between the digital camera 100 and the smartphone 200 having the camera application 400 installed therein is performed via this camera control SDK (hereinafter, camera SDK) 402, which is a communication application software program. A control application software program other than the camera SDK 402 (hereinafter, camera control application 401) plays a role in other functions, e.g., receiving a user operation, displaying a GUI, and activating/deactivating the camera application 400.

The camera SDK 402 is expected to be provided from a vendor of the digital camera 100 to an application developer. Therefore, the application developer determines whether to incorporate the camera SDK 402, which is provided for a smartphone OS, into the camera application 400 depending on the smartphone 200 that is expected to install the application therein.

<Basic Processing Sequence of Camera Application>

Figure 5:
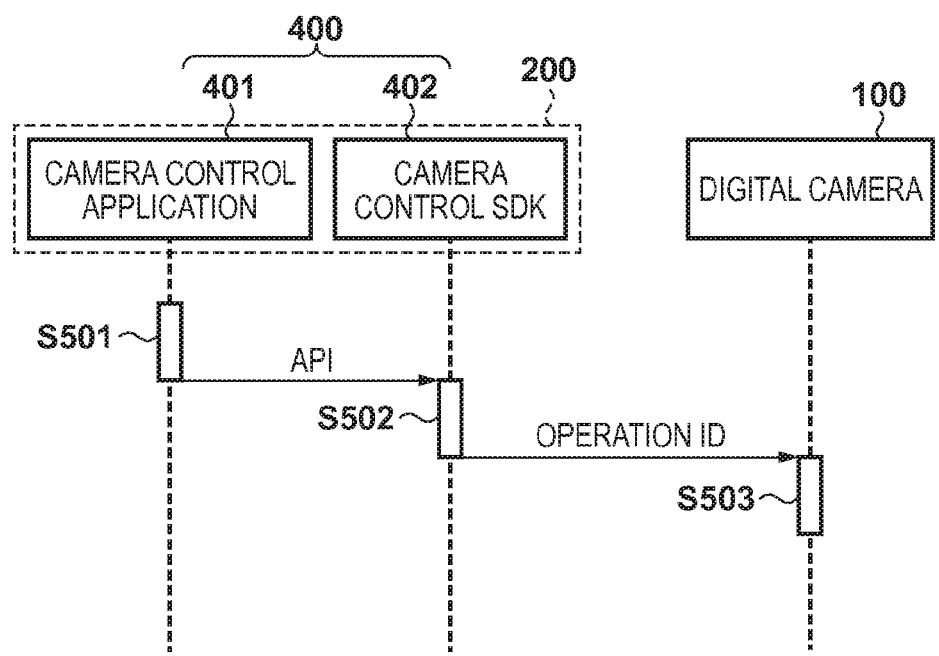
FIG. 5 shows a basic processing sequence of the camera application according to the present embodiments.

A description is now given of a basic processing sequence of the camera application 400 for a case in which connection between the digital camera 100 and the smartphone 200 has been established with reference to FIG. 5.

In FIG. 5, the camera control application 401 calls up an application programming interface (hereinafter, API) of the camera SDK 402 corresponding to a substance of desired control, and requests the camera SDK 402 for processing (step S501).

Upon receiving the API call from the camera control application 401, the camera SDK 402 identifies operation information (ID) of a communication protocol that is suitable for a substance of processing for the called API, and transmits the operation ID to the digital camera 100 (step S502).

Upon receiving the operation ID from the camera SDK 402, the digital camera 100 executes camera control corresponding to the requested operation ID (step S503).

Examples of the types of control functions corresponding to operation IDs transmitted from the camera SDK 402 to the digital camera 100 include AF start (shooting preparation operation), release, change in a shooting parameter, live view (LV) start, acquisition of an LV image, and acquisition of an image file (see FIGS. 8A and 8B).

As indicated above, communication between the digital camera 100 and the camera SDK 402 is controlled using operation IDs; however, a communication protocol has a risk of being analyzed using a network analyzer and the like.

If an operation ID corresponding to an API provided by the camera SDK 402 to the camera control application 401 is decrypted, an application that directly controls the digital camera 100 without using the camera SDK 402 can be undesirably generated. In this case, there is a possibility of a malfunction caused by execution of unexpected control in the digital camera 100 due to inexecution of error processing and the like by the camera SDK 402.

Meanwhile, it may be possible to make the analysis of communication protocols difficult by encrypting all operation IDs in communication between the digital camera 100 and the camera SDK 402. However, in order to encrypt all operation IDs, both of the digital camera 100 and the smartphone 200 need to execute cryptanalysis processing, which leads to an increase in the load of calculation processing and a delay in processing.

In view of this, in the present embodiment, operation IDs that are assigned in every control functions are changed each time the camera SDK 402 and the digital camera 100 are connected. The digital camera 100 is configured to encrypt the changed operation IDs and give notice of the encrypted operation IDs and decryption information to the camera SDK 402.

<Processing Sequence of Camera SDK and Digital Camera>

Figure 7A:
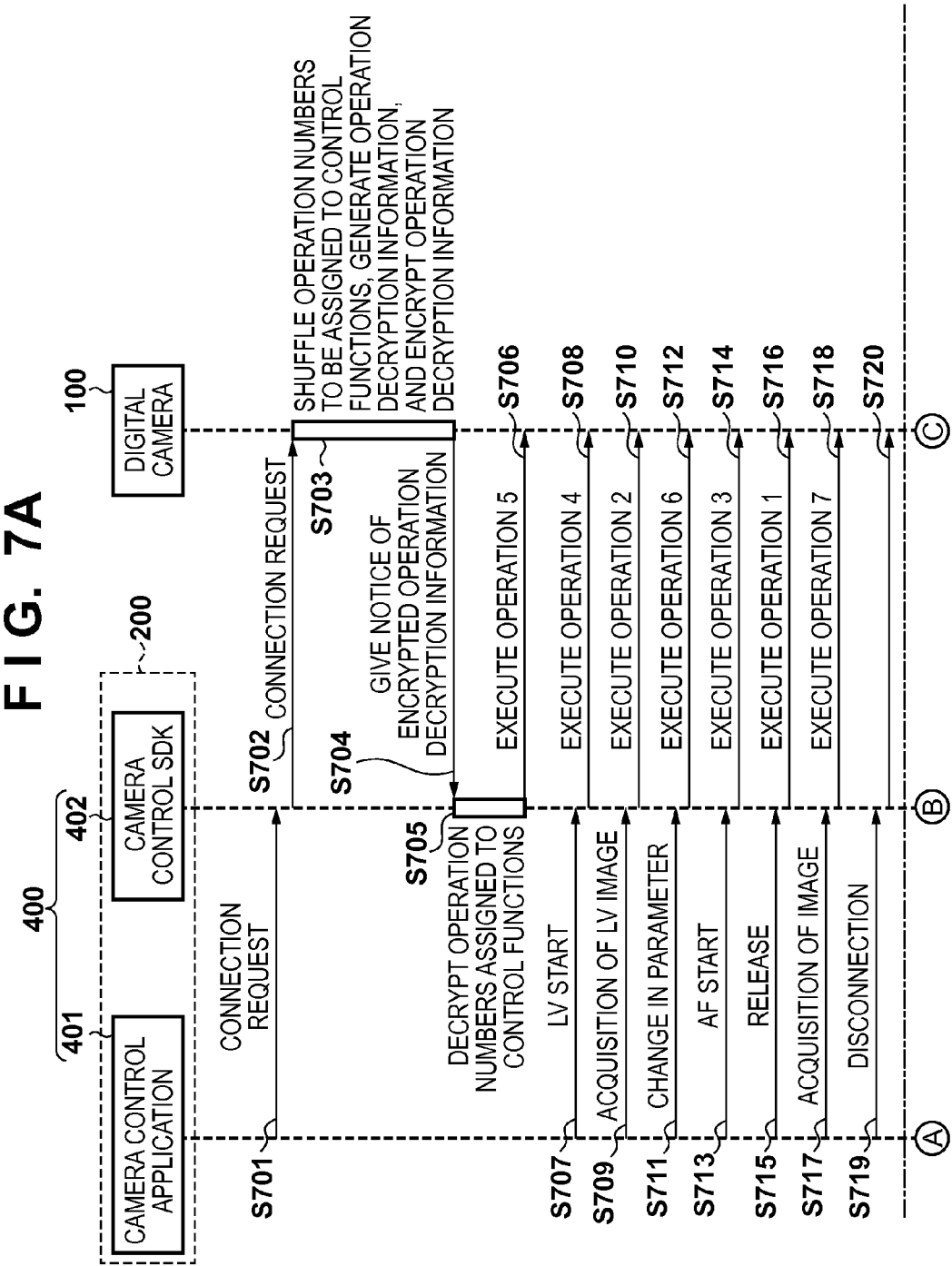
FIGS. 7A and 7B show processing sequences of the camera application and the digital camera according to a first embodiment.
Figure 7B:
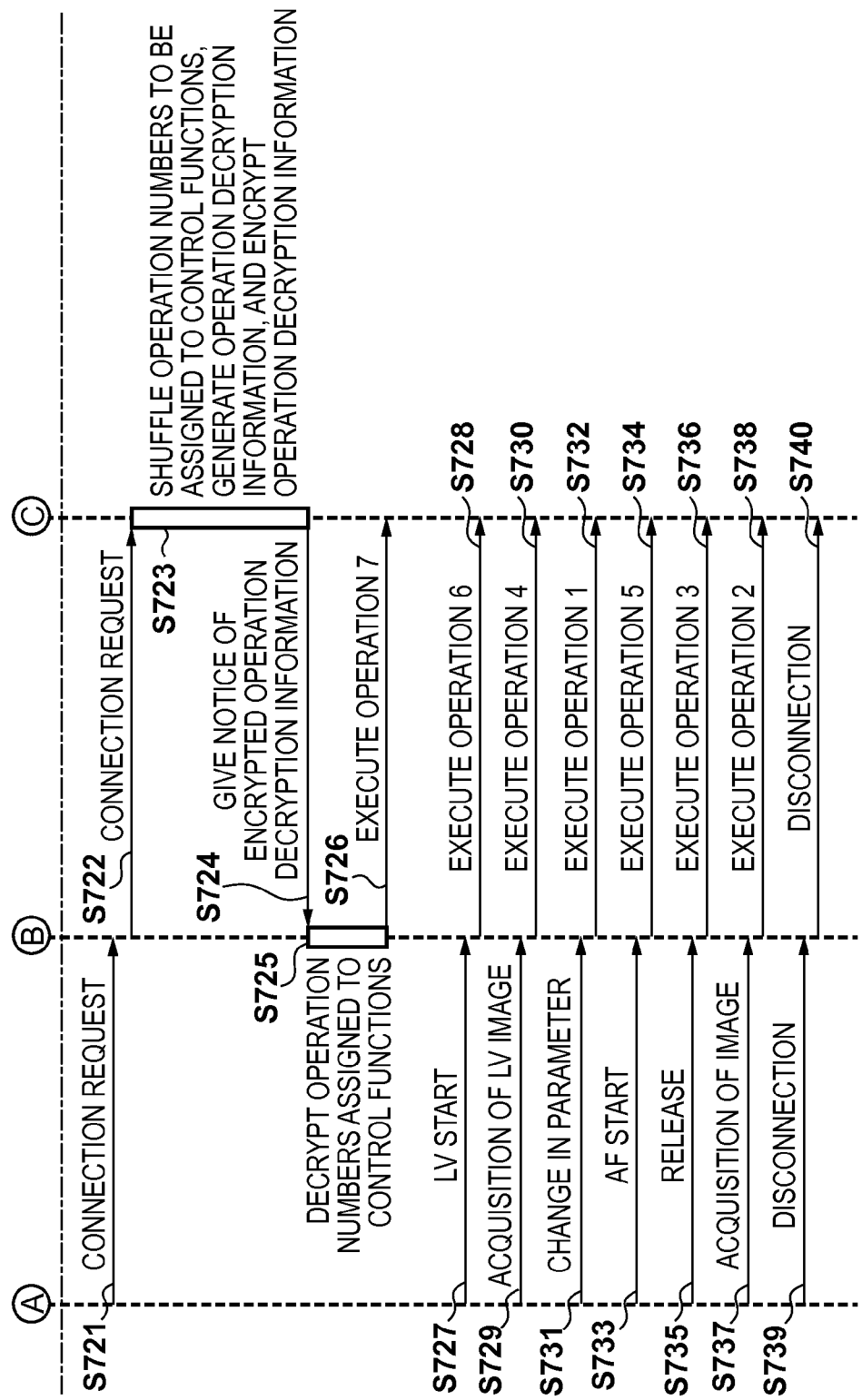

A description is now given of a processing sequence of the camera application 400 in the smartphone 200 and the digital camera 100 according to the present embodiment with reference to FIGS. 7A and 7B.

The processing sequence according to the present embodiment is started when connection between the smartphone 200 in which the camera application 400 has been activated and the digital camera 100 is established in accordance with the procedure described with reference to FIG. 5. It should be noted that, in the processing sequence according to the present embodiment, processing of the digital camera 100 is realized by the microcomputer 123 reading a control program stored in the non-volatile memory 130 into a system memory, such as a RAM, and executing the read control program. On the other hand, processing of the smartphone 200 is realized by the CPU 201 reading a control program stored in the ROM 202 into the RAM 203 and executing the read control program.

Below, processing executed by reading, from the camera application 400, the camera control application 401 independently of the camera SDK 402 and processing executed by reading the camera SDK 402 will be discussed in distinction from each other. To facilitate the understanding, these items of software will be treated as the main executors of processing in some portions of the following description; however, in reality, the main executor of operations is the CPU 201 that has read the camera control application 401 or the camera SDK 402.

In FIGS. 7A and 7B, once the camera application 400 has been activated in the smartphone 200 by a user operation, the camera control application 401 issues a connection request to the camera SDK 402 (step S701).

Upon receiving the connection request, the camera SDK 402 transmits an operation corresponding to the connection request to the digital camera 100 (step S702).

Upon receiving the operation corresponding to the connection request from the camera SDK 402, the digital camera 100 shuffles operation numbers to be assigned to control functions and generates operation decryption information (FIG. 8A) into the memory 120. Then, it encrypts the operation decryption information (step S703) and transmits the encrypted operation decryption information to the camera SDK 402 (step S704).

Upon receiving the operation decryption information from the digital camera 100, the camera SDK 402 decrypts the encrypted operation decryption information and records the operation decryption information (FIG. 8A) into the RAM 203 (step S705). The camera SDK 402 also gives notice of successful cryptanalysis of the operation decryption information to the digital camera 100 (step S706). Specifically, the camera SDK 402 refers to the operation decryption information, and gives notice of operation ID No. 5, which is assigned to an operation corresponding to successful decryption of the operation decryption information, to the digital camera 100.

Upon receiving the operation assigned operation ID No. 5 from the camera SDK 402, the digital camera 100 refers to the operation decryption information and determines that the received operation is the operation corresponding to successful decryption of the decryption information. After the transmission of the operation decryption information, if the first operation that the digital camera 100 receives from the camera SDK 402 is the operation corresponding to successful decryption, it executes processing of an operation that is received thereafter. However, after the transmission of the operation decryption information, if the first operation received is not the operation corresponding to successful decryption, it is determined that the operation decryption information has not been normally decrypted, and errors are transmitted in response to all operations received thereafter without executing processing thereof.

A description is now given of a sequence in which the camera control application 401 controls the digital camera 100.

FIG. 6 is an application screen that is displayed on the display unit 211 upon activation of the camera control application 401. This UI screen may be displayed at the same time as the activation of the camera application 400, or may be displayed after receiving a notice of completion of processing up until step S706 from the camera SDK 402.

In FIG. 6, the following are exemplarily displayed as functions of the digital camera 100 that can be controlled by the smartphone 200: display of a live view image, AF start, still image shooting, and exposure correction. A live view button 602 is a button for setting whether to acquire a live view (hereinafter, LV) image from the digital camera 100 and display the live view image. When the live view button 602 is in an on state, the smartphone 200 acquires a live view image from the digital camera 100 and displays the live view image in a live view display region 601. When the live view button 602 is in an off state, the smartphone 200 does not acquire a live view image from the digital camera 100, and the live view display region 601 is in a non-display state. An AF button 603 is a button for instructing the digital camera 100 to start autofocus. A release button 604 is a button for instructing the digital camera 100 to shoot a still image. An exposure button 605 is a button for instructing the digital camera 100 to perform exposure correction, and when the user presses this button, a candidate correction value (e.g., −2 to +2) is displayed so as to enable the user to set a desired correction value.

A description is now given of a case in which the user operates the camera control application 401 on the application screen shown in FIG. 6. When the live view button 602 on the UI screen shown in FIG. 6 is pressed, the camera control application 401 issues an LV start request to the camera SDK 402 (step S707).

Upon receiving the LV start request, the camera SDK 402 determines that operation ID No. 4 is assigned to LV start based on the operation decryption information decrypted in step S705, and transmits an LV request to the digital camera 100 (step S708).

Upon receiving the LV start request, the digital camera 100 starts to generate an LV image.

Thereafter, the camera control application 401 issues an LV image acquisition request to the camera SDK 402 (step S709).

Upon receiving the LV image acquisition request, the camera SDK 402 determines that operation ID No. 2 is assigned to acquisition of an LV image based on the operation decryption information decrypted in step S705, and transmits an LV image acquisition request to the digital camera 100 (step S710).

Upon receiving the LV image acquisition request, the digital camera 100 transmits a generated LV image to the camera SDK 402, and the camera SDK 402 passes the received LV image to the camera control application 401. Through the foregoing processes, the camera control application 401 can display a live view image received from the digital camera 100 in the live view display region 601. Furthermore, an image in the live view display region 601 is updated by executing the processes of steps S709 and S710 on a periodic basis.

A description is now given of a case in which the exposure button 605 on the UI screen shown in FIG. 6 is pressed.

When the exposure button 605 is pressed by a user operation, the camera control application 401 issues a parameter change request to the camera SDK 402 in step S711.

Upon receiving the parameter change request, the camera SDK 402 determines that operation ID No. 6 is assigned to change in a parameter based on the operation decryption information decrypted in step S705, and transmits a parameter change request to the digital camera 100 (step S712).

Upon receiving the parameter change request, the digital camera 100 analyzes a substance of the parameter change request and performs exposure correction.

A description is now given of a case in which the AF button 603 on the UI screen shown in FIG. 6 is pressed.

When the AF button 603 is pressed by a user operation, the camera control application 401 issues an AF start request to the camera SDK 402 in step S713.

Upon receiving the AF start request, the camera SDK 402 determines that operation ID No. 3 is assigned to AF start based on the operation decryption information decrypted in step S705, and transmits an AF start request to the digital camera 100 (step S712).

Upon receiving the AF start request, the digital camera 100 starts AF to achieve focus.

A description is now given of a case in which the release button 604 on the UI screen shown in FIG. 6 is pressed.

When the release button 604 is pressed by a user operation, the camera control application 401 issues a release request to the camera SDK 402 in step S715.

Upon receiving the release request, the camera SDK 402 determines that operation ID No. 1 is assigned to release based on the operation decryption information decrypted in step S705, and transmits a release request to the digital camera 100 (step S712).

Upon receiving the release request, the digital camera 100 shoots and acquires a new image by performing a release operation.

If the shooting of a still image succeeds, the camera control application 401 issues an image file acquisition request to the camera SDK 402.

Upon receiving the image file acquisition request, the camera SDK 402 determines that operation ID No. 7 is assigned to acquisition of an image file based on the operation decryption information decrypted in step S705, and transmits an image file acquisition request to the digital camera 100 (step S712).

Upon receiving the image file acquisition request, the digital camera 100 transmits the shot still image to the camera SDK 402, and the camera SDK 402 passes the received still image to the camera control application 401. The still image shot by the digital camera 100 can be stored into the smartphone 200 by the camera control application 401 storing the received still image into the ROM 202.

A description is now given of a case in which the camera application 400 is deactivated.

When the camera application 400 is deactivated by a user operation, the camera control application 401 issues a disconnection request to the camera SDK 402 in step S719.

Upon receiving the disconnection request, the camera SDK 402 transmits a disconnection request to the digital camera 100 (step S720).

Upon receiving the disconnection request, the digital camera 100 disconnects communication with the smartphone 200.

A description is now given of a case in which the camera application 400 is reactivated.

It should be noted that the present sequence differs from the processes of steps S701 to S720 of FIGS. 7A and 7B only in the operation decryption information generated in steps S703 to S706. Therefore, a description of similar processes is omitted, and the following description focuses on the differences.

First, in steps S721 and S722, processes that are similar to the processes of steps S701 and S702 are executed.

Thereafter, upon receiving an operation corresponding to a connection request from the camera SDK 402, the digital camera 100 shuffles operation numbers to be assigned to control functions and generates operation decryption information (FIG. 8B) into the memory 120. Then, it encrypts the operation decryption information (step S723) and transmits the encrypted operation decryption information to the camera SDK 402 (step S724).

Upon receiving the operation decryption information from the digital camera 100, the camera SDK 402 decrypts the encrypted operation decryption information and records the operation decryption information (FIG. 8B) into the RAM 203 (step S725). The camera SDK 402 also gives notice of successful cryptanalysis of the operation decryption information to the digital camera 100 (step S706). Specifically, the camera SDK 402 refers to the operation decryption information, and gives notice of operation ID No. 7, which is assigned to an operation corresponding to successful decryption of the operation decryption information, to the digital camera 100.

Subsequent steps S727 to S740 differ only in the operation IDs used in steps S707 to S720 as follows.

In step S708, operation ID No. 4 is assigned to LV start, whereas in step S728, operation ID No. 6 is assigned to LV start.

In step S710, operation ID No. 2 is assigned to acquisition of an LV image, whereas in step S730, operation ID No. 4 is assigned to acquisition of an LV image.

In step S712, operation ID No. 6 is assigned to change in a parameter, whereas in step S732, operation ID No. 1 is assigned to change in a parameter.

In step S714, operation ID No. 3 is assigned to AF start, whereas in step S734, operation ID No. 5 is assigned to AF start.

In step S716, operation ID No. 1 is assigned to release, whereas in step S736, operation ID No. 3 is assigned to release.

In step S718, operation ID No. 7 is assigned to acquisition of an image, whereas in step S738, operation ID No. 2 is assigned to acquisition of an image.

As described above, in communication between the smartphone 200 and the digital camera 100 according to the present embodiment, APIs for the camera control application 401 and the camera SDK 402 are not changed, but operation IDs for the camera SDK 402 and the digital camera 100 are changed each time connection is established.

In this configuration, even if a communication protocol between the digital camera 100 and the smartphone 200 is analyzed, operation IDs for controlling the digital camera 100 cannot be discovered unless the encrypted operation decryption information is decrypted; this makes it difficult to generate a camera control application 401 that does not use the camera SDK 402.

As a result, security at the time of communication can be improved without encrypting all communication between the digital camera 100 and the camera application 400.

It should be noted that the types of operations are not limited to the types discussed in the present embodiment, and the configuration of the operation decryption information is not limited to the configuration shown in FIGS. 8A and 8B.

Although the present embodiment adopts a configuration in which operation IDs of all camera control operations are changed, it may instead adopt a configuration in which operation IDs of only a part of operations are changed.

Second Embodiment

Figure 9B:
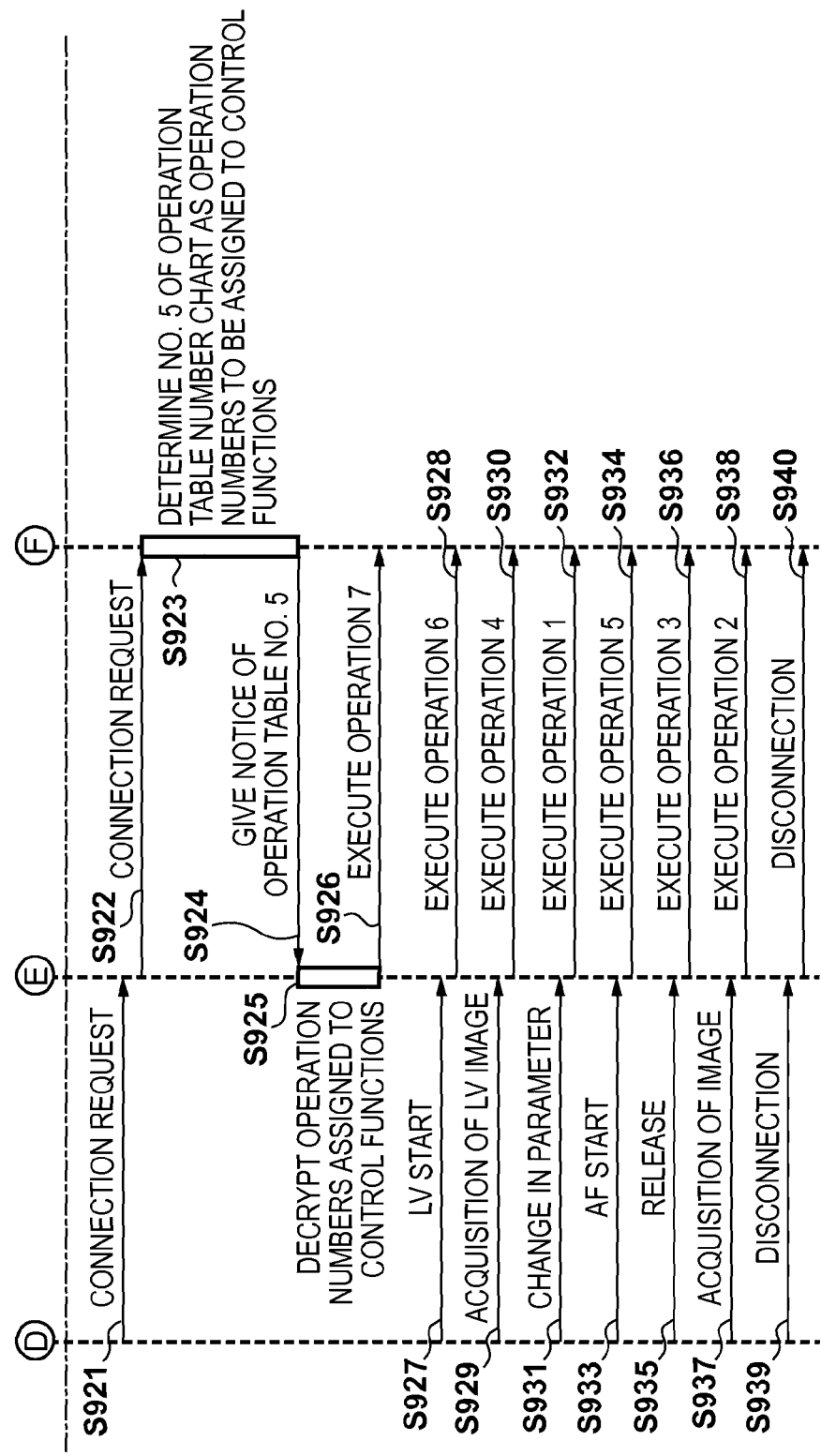

A description is now given of a processing sequence in which the camera control SDK according to the second embodiment encrypts operation numbers with reference to FIGS. 9A, 9B and 10.

The above-described first embodiment pertains to an example case in which the digital camera 100 encrypts the operation decryption information and gives notice of the same to the camera SDK 402. In contrast, the present embodiment adopts a configuration in which the camera SDK 402 has the same tables including the operation decryption information, and the digital camera 100 gives notice of an operation table number to the camera SDK 402.

Below, a description of portions that are the same as the first embodiment is omitted, and a description is given with a focus on portions that are peculiar to the present embodiment.

It should be noted that the configurations of the digital camera 100 and the smartphone 200 constituting the system of the present embodiment are the same as the configurations shown in FIGS. 1 to 3.

FIGS. 9A and 9B show processing sequences for a case in which the digital camera 100 and the smartphone 200 according to the present embodiment have been connected. FIG. 10 shows an operation table number chart that is shared by the digital camera 100 and the camera SDK 402 of the smartphone 200 according to the present embodiment.

In steps S901 and S902, processes that are similar to the processes of steps S701 and S702 are executed.

Upon receiving an operation corresponding to a connection request from the camera SDK 402, the digital camera 100 randomly selects operation numbers to be assigned to control functions from the operation table number chart shown in FIG. 10 (step S903). It is assumed here that operation table No. 3 is determined. Then, operation table No. 3 is transmitted to the camera SDK 402 (step S904).

Upon receiving operation table No. 3, the camera SDK 402 configures the setting such that No. 3 of the operation table number chart held in the camera SDK 402 is used in communication from then on (step S905). The camera SDK 402 also gives notice of successful decryption of the operation table number chart to the digital camera 100 (step S906). Specifically, the camera control SDK 402 refers to No. 3 of the operation table number chart, and gives notice of operation ID No. 5, which is assigned to an operation corresponding to successful decryption of the operation decryption information, to the digital camera 100.

It should be noted that the processes of steps S907 to S920 in the present sequence shown in FIGS. 9A and 9B differ from the processes of steps S707 to S720 shown in FIGS. 7A and 7B only in that an operation ID is obtained using the operation table number chart in the former processes, whereas an operation ID is obtained by decrypting an encrypted operation table according to the first embodiment in the latter processes. Therefore, a description of similar processes is omitted, and the following description focuses on the differences.

A description is now given of a case in which the camera application 400 is reactivated.

In steps S921 and S922, processes that are similar to the processes of steps S721 and S722 are executed.

Upon receiving an operation corresponding to a connection request from the camera SDK 402, the digital camera 100 determines, for example, No. 5 of the operation table number chart shown in FIG. 10 as operation numbers to be assigned to control functions (step S923), and transmits operation table No. 5 to the camera SDK 402 (step S924).

Upon receiving operation table No. 5, the camera SDK 402 configures the setting such that No. 5 of the operation table number chart held in the camera SDK 402 is used in communication from then on (step S925). The camera SDK 402 also gives notice of successful cryptanalysis of the operation table number chart to the digital camera 100 (step S926). Specifically, the camera SDK 402 refers to No. 5 of the operation table number chart, and gives notice of operation ID No. 7, which is assigned to an operation corresponding to successful decryption of the operation decryption information, to the digital camera 100.

It should be noted that the processes of steps S927 to S940 in the present sequence shown in FIGS. 9A and 9B differ from the processes of steps S727 to S740 shown in FIGS. 7A and 7B only in that an operation ID is obtained using the operation table number chart in the former processes, whereas an operation ID is obtained by decrypting an encrypted operation table according to the first embodiment in the latter processes.

As described above, in the present embodiment, the digital camera 100 and the camera SDK 402 share the same operation table number chart; in this way, in communication between the smartphone 200 and the digital camera 100, APIs for the camera application and the camera SDK 402 are not changed, but operation IDs for the camera SDK 402 and the digital camera 100 are changed each time connection is established.

In this configuration, even if a communication protocol between the digital camera 100 and the smartphone 200 is analyzed, operation IDs for controlling the digital camera 100 cannot be discovered unless the operation table number chart held in the digital camera 100 and the camera SDK 402 is decrypted; this makes it difficult to generate a camera control application 401 that does not use the camera SDK 402.

As a result, security at the time of communication can be improved without encrypting all communication between the digital camera 100 and the camera application 400.

It should be noted that the types of operations are not limited to the types discussed in the present embodiment, and the configuration of the operation table number chart is not limited to the configuration shown in FIG. 10.

Although the present embodiment adopts a configuration in which all operation IDs for the camera control application 401 are changed, it may instead adopt a configuration in which operation IDs of only a part of operations are changed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-142640, filed Jul. 10, 2014, which is hereby incorporated by reference herein in its entirety.

What is claimed is:

1. An external apparatus which is controlled by a communication apparatus, comprising:
a controller configured to control the external apparatus; and a communication interface configured to communicate with the communication apparatus, wherein the controller functions as a transmission unit, a receiving unit, an operation executing unit and a changing unit, the transmission unit transmits, via the communication interface, operation information including a relation of each function of the external apparatus and operation identifiers, and each operation identifier is assigned in each function of the external apparatus, the receiving unit receives, via the communication interface, at least one of the operation identifiers, the operation executing a unit executes function corresponding to the operation identifier received from the communication apparatus, the changing unit changes the relation of each function of the external apparatus and operation identifiers, wherein the relation is changed by the changing unit each time connection to the communication apparatus is established via the communication interface, and wherein the transmission unit transmits the operation information changed by the changing unit via the communication interface.

2. The external apparatus according to claim 1, wherein the controller further functions as an encrypting unit configured to encrypt the operation information, and wherein the transmission unit transmits, via the communication interface, the operation information encrypted by the encrypting unit.

3. The external apparatus according to claim 2, wherein the transmission unit further transmits decryption information for decrypting the encrypted operation information.

4. The external apparatus according to claim 3, wherein upon receiving a connection request from the communication apparatus, the changing unit changes the operation information, and the transmission unit transmits the changed operation information to the communication apparatus together with the decryption information.

5. The external apparatus according to claim 2, wherein the receiving unit receives the operation identifier which is not encrypted.

6. The external apparatus according to claim 1, wherein the operation identifier received by the receiving unit is selected among the operation identifiers using the operation information transmitted by the transmission unit.

7. The external apparatus according to claim 1, wherein the operation executing unit applies error processing to the operation identifier received from the communication apparatus until the communication apparatus gives notice of successful decryption of the operation information.

8. The external apparatus according to claim 1, wherein the external apparatus is an image capturing apparatus, and the function of the external apparatus includes one of the following functions: a shooting preparation operation, image shooting, change in a shooting parameter, live view start, acquisition of a live view image, and acquisition of an image file.

9. The external apparatus according to claim 1, wherein the operation executing unit applies error processing to the operation identifier received from the communication apparatus until the receiving unit receives an operation identifier indicating successful decryption of the operation information.

10. A communication apparatus which controls an external apparatus, comprising:

a controller configured to control the external apparatus; and a communication interface configured to communicate with the external apparatus, wherein the controller functions as a receiving unit and a transmission unit, the receiving unit receives, via the communication interface, operation information including a relation of each function of the external apparatus and operation identifiers, and each operation identifier is assigned in the function of the external apparatus;

the transmission unit transmits, via the communication interface, operation identifier for causing the external apparatus to execute a predetermined function; and wherein the relation of each function of the external apparatus and operation identifiers is changed each time connection to the communication apparatus is established via the communication interface.

11. The communication apparatus according to claim 10, wherein the operation information received by the receiving unit is encrypted, and the controller further functions as a decrypting unit configured to decrypt the encrypted operation information.

12. The communication apparatus according to claim 10, wherein the transmission unit transmits notice of successful decryption of the operation information to the external apparatus.

13. The communication apparatus according to claim 10, wherein the external apparatus is an image capturing apparatus, and the function of the external apparatus includes one of the following functions: a shooting preparation operation, image shooting, change in a shooting parameter, live view start, acquisition of a live view image, and acquisition of an image file.

14. The communication apparatus according to claim 10, wherein communication application software that causes the communication interface to function for the purpose of controlling communication with the external apparatus is a software program that is generated by a software development kit to be incorporated in control application software that causes the control interface to function for the purpose of controlling the external apparatus.

15. The communication apparatus according to claim 10, wherein the transmission unit transmits an operation identifier indicating successful decryption of the operation information.

16. A control method of an external apparatus which is communicated with and controlled by a communication apparatus, the method comprising:

transmitting operation information including a relation of each function of the external apparatus and operation identifiers, and each operation identifier is assigned in each function of the external apparatus;

receiving at least one of the operation identifiers;

executing function corresponding to the operation identifier received from the communication apparatus; and changing the relation of each function of the external apparatus and operation identifiers, wherein the relation is changed each time connection to the communication apparatus is established; and wherein the transmitting step transmits the operation information changed in the changing step.

17. A control method of a communication apparatus which controls an external apparatus and communicates with the external apparatus, the method comprising:
receiving operation information including a relation of each function of the external apparatus and operation identifiers, and each operation identifier is assigned in the function of the external apparatus;
transmitting operation identifier for causing the external apparatus to execute a predetermined function to the external apparatus; and
wherein the relation of each function of the external apparatus and operation identifiers is changed each time connection to the communication apparatus is established.

18. A system in which a communication apparatus and an external apparatus are connected,
wherein the external apparatus comprises:
a first controller configured to control the external apparatus; and
a first communication interface configured to communicate with the communication apparatus,
wherein the first controller functions as a first transmission unit, a first receiving unit, an operation executing unit and a changing unit,
the first transmission unit transmits, via the first communication interface, operation information including a relation of each function of the external apparatus and operation identifiers, and each operation identifier is assigned in each function of the external apparatus,
the first receiving unit receives, via the first communication interface, at least one of the operation identifiers,
the operation executing unit executes function corresponding to the operation identifier received from the communication apparatus,
the changing unit changes the relation of each function of the external apparatus and operation identifiers, wherein the relation is changed by the changing unit each time connection to the communication apparatus is established via the first communication interface; and
wherein the first transmission unit transmits the operation information changed by the changing unit via the first communication interface, and
wherein the communication apparatus comprises:
a second controller configured to control the external apparatus; and
a second communication interface configured to communicate with the external apparatus,
wherein the second controller functions as a second receiving unit and a second transmission unit,
the second receiving unit receives, via the second communication interface, operation information including the relation of each function of the external apparatus and operation identifiers, and each operation identifier is assigned in the function of the external apparatus;
the second transmission unit transmits, via the second communication interface, the operation identifier for causing the external apparatus to execute a corresponding predetermined function; and
wherein the relation of each function of the external apparatus and operation identifiers is changed each time connection to the communication apparatus is established via the second communication interface.

19. A non-transitory computer-readable storage medium storing a program for causing a computer to execute the control method of an external apparatus which is communicated with and controlled by a communication apparatus, the method comprising:
transmitting operation information including a relation of each function of the external apparatus and operation identifiers, and each operation identifier is assigned in each function of the external apparatus;
receiving at least one of the operation identifiers;
executing function corresponding to the operation identifier received from the communication apparatus; and
changing the relation of each function of the external apparatus and operation identifiers, wherein the relation is changed each time connection to the communication apparatus is established; and
wherein the transmitting step transmits the operation information changed in the changing step.

20. A non-transitory computer-readable storage medium storing a program for causing a computer to execute the control method of a communication apparatus which controls an external apparatus and communicates with the external apparatus, the method comprising:
receiving operation information including a relation of each function of the external apparatus and operation identifiers, and each operation identifier is assigned in the function of the external apparatus;
transmitting operation identifier for causing the external apparatus to execute a predetermined function to the external apparatus; and
wherein the relation of each function of the external apparatus and operation identifiers is changed each time connection to the communication apparatus is established.

* * * * *